3,507,857
AMIDINOHYDRAZONES OF KETOSTEROIDS
Kurt W. Ledig, Philadelphia, and Gerhard R. Wendt, Havertown, Pa., assignors to American Home Products Corporation, New York, N.Y., a corporation of Delaware
No Drawing. Filed Nov. 6, 1967, Ser. No. 680,941
Int. Cl. C07c *173/10, 169/20*
U.S. Cl. 260—239.5
13 Claims

ABSTRACT OF THE DISCLOSURE

This invention is concerned with amidinohydrazones of 3-ketosteroids which have demonstrated usefulness as topical antibacterial agents.

This invention relates to new and novel amidinohydrazones of 3-ketosteroids which are active antibacterial agents against gram-positive organisms.

The new and novel compounds within the scope of the present invention are represented by the following structural formula:

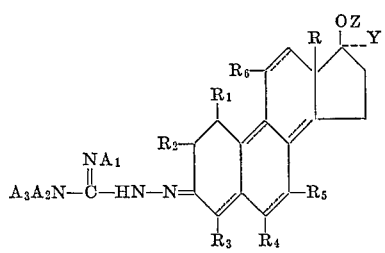

wherein R is lower alkyl; $R_1$, $R_2$, $R_3$, $R_4$, $R_5$, and $R_6$ are selected from the group consisting of hydrogen and methyl with the proviso that only two of $R_1$, $R_2$, $R_3$, $R_4$, $R_5$ and $R_6$ are methyl; Z is selected from the group consisting of hydrogen, lower alkyl and lower alkanoyl; Y is selected from the group consisting of lower alkyl, lower alkenyl, hydroxy(lower)alkyl, trifluorovinyl, carboxy (lower)alkenyl, lower alkynyl, halo(lower)alkynyl, hydroxy(lower)alknyl and carboxy(lower)alkynyl; $A_1$ and $A_2$ when taken separately are selected from the group consisting of hydrogen and lower alkyl; $A_1$ and $A_2$ when taken together form an imidazoline ring; $A_3$ is selected from the group consisting of hydrogen, lower alkyl, di(lower)alkylamino(lower)alkyl, hexamethyleneimino (lower)alkyl, heptamethyleneimino(lower)alkyl, and octamethyleneimino(lower)alkyl, with the proviso that when $A_1$ and $A_2$ are taken together form an imidazoline ring, $A_3$ is hydrogen; wherein the 4,5-, 6,7-, 9,10-, 8,14- and 11,12-positions are either saturated or unsaturated with the proviso that no more than three of these positions may be unsaturated; and the pharmaceutically acceptable acid-addition salts thereof. The terms lower alkyl, lower alkoxy, lower alkenyl, lower alkynyl as employed herein are meant to include those straight chain and branched moieties having from one to about seven carbon atoms. Typical examples of the compounds of this invention are: dl-17α - chloroethynyl-13-ethyl-17-hydroxygon-4-en-3-one, amidinohydrazone, nitrate; dl - 13, 17α-diethyl-17-hydroxygon-4-en-3-one, amidinohydrazone nitrate; d - 17α-chloro-ethynyl-17-hydroxyestr-4-en-3-one, amidinohydrazone, nitrate; 17-trifluorovinyl-17-hydroxyestra - 4,9 - dien-3-one, amidinohydrazone, hydrochloride; 17α-ethynyl-17-hydroxyestra-4,9,11-trien-3-one, amidinohydrazone, nitrate; and dl-17α-chloroethynyl-17-hydroxy-13-(n-propyl)gon-4-en-3-one, amidinohydrazone, nitrate.

The compounds of the present invention may be prepared by the process depicted in the following equation:

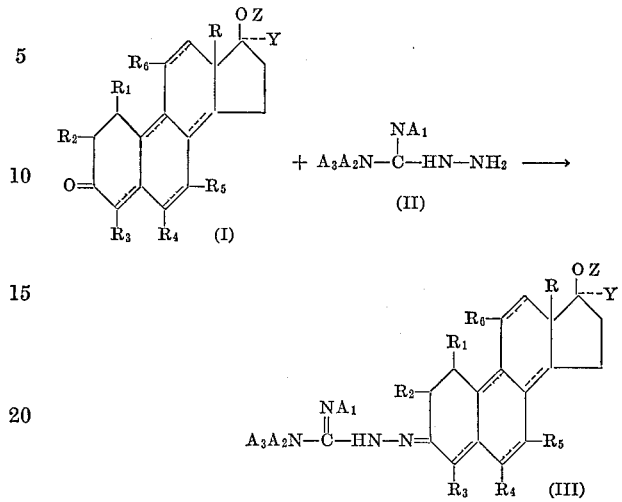

wherein R, $R_1$, $R_2$, $R_3$, $R_4$, $R_5$, $R_6$, Z, Y, $A_1$, $A_2$, $A_3$, and the 4,5-, 6,7-, 9,10-, 8,14-, 11,12-positions are defined as above. The reaction is effected by adding a 3-ketosteroid (I) to a solution of an aminoguanidine salt (II), preferably a nitrate in an alkanol e.g. methanol and subsequent acidification with a mineral acid.

When the reaction is complete, the steroidal amidinohydrazone (III) is separated by standard recovery procedures, e.g. concentration and filtration.

The salts can be converted to the free base by treatment of a solution of the salt in an alkanol with an excess of a base such as sodium methoxide. The free base of the steroidal amidinohydrazones can be converted into acceptable non-toxic salts by treating with an appropriate organic or inorganic acid advantageously in a solvent such as ether, methanol or ethyl acetate.

Many of the aminoguanidines (II) employed in the preparation of the compounds of this invention are known compounds which are commercially available while others may be prepared by processes described in the prior art, for example, the 1-(lower)alkyl-3-aminoguanidines, the 1,1 - di(lower)alkyl-3-aminoguanidines and 1,2-di(lower)alkyl-3-aminoguanidines may be prepared by the process described in J. Med. Chem. 6, 283 (1963); the 2-(2-imidazolin-2-yl)hydrazine may be prepared by the process described in J. Org. Chem. 18, 790 (1953); the 1 - [di(lower)alkylamino(lower)alkyl]-3-aminoguanidines may be prepared by the process described in J. Med. Chem. 7, 493 (1964); and the 1-[hexamethyleneimino(lower)alkyl]-3-aminoguanidines, the 1-[heptamethyleneimino(lower)alkyl] - 3-aminoguanidines and the 1 - [octamethyleneimino(lower)alkyl]-3-aminoguanidines may be prepared by the process described in Bull. Soc. Chim. France 561 (1962). Many of the 13-methyl-3-ketosteroid reactants are also known compounds which are commercially available while others may be prepared by procedures which are described in the literature, e.g. 17α-trifluorovinyl-17-hydroxyestra-4,9-dien-3-one as described in U.S. 3,300,518 issued on Jan. 24, 1967 to Fried et al.; 17α-ethynyl-17-hydroxyestra-4,9,11-trien-3-one acetate as described in Netherlands Patent 10741 issued in 1966 to Ciba Ltd; 17α-ethyl-17-hydroxy-5α-estran-3-one as described in the J. Am. Chem. Soc. 80 6115 (1958); 17α-chloroethynyl-17-hydroxyestra-4,9,11-trien-3-one as described in Compt. Rend. 260, 4545 (1965); 17-hydroxy-7α,17-dimethylestr-4-en-3-one as described in Steriods 1, 317 (1963); 17-ethyl-17-hydroxy-2α-methylestr-4-en-3-one by the procedure described in Tetrahedron 21, 2501 (1965); 17-hydroxy-17-ethynyl - 1α7α-dimethylestr-4-en-3-one as described in I.C.F. vol. 10, Netherlands, Week No. 145 Basic 18,863; 17β-hydroxy-11,17-dimethylestr-4-en-3-one by the procedure described in U.S. 3,299,108 issued on Jan. 17, 1967 to John S. Baran; and 17β-hydroxy-17-ethynylestra-4,8(14)-dien-3-one by the procedure described in J. Org. Chem. 31, pg. 3780 (1966). The 13-lower alkyl-3-keto-steroid reactants are prepared from or in accord with the prior art processes as described in copending U.S. application, Ser. No. 388,820, filed on Aug. 11, 1964 and entitled "Synthesis of Gon-4-enes"; U.S. Ser. No. 386,987, filed Aug. 3, 1964 and entitled "13-Ethylgona-4,9-Dienes"; and U.S. Ser. No. 386,986, filed on Aug. 3, 1964 and entitled "D-Homogona-4,9-Dienes and Process."

In accord with the present invention, the new steroidal amidinohydrazones herein described have been found to possess interesting pharmaceutical properties which render them useful as synthetic medicinals. More particularly, these compounds, in standard pharmacological tests have exhibited utility as topical antibacterial agents. The compounds of this invention inhibit the growth of gram-positive organisms, e.g. *S. aureus* in concentrations of about 5 mcgms./ml. to about 30 mcgms./ml. Some of the compounds of this invention have also demonstrated antifungal acitvity, e.g. against Histoplasma capsulatum and trichomonicidal activity.

The compounds of this invention, when used as topical antibacterial agents, may be used in compositions at concentrations from about 0.001 percent to about 1.0 percent. Although higher concentrations can be employed in isolated instances, the exceptionally high antibacterial activity characterizing the compounds of this invention when used topically against gram-positive organisms generally obviates the necessity therefor. The preferred range for the majority of indications is from about 0.01 percent to about 0.25 percent. In use, these compounds are employed in a manner appropriate to the specific pharmaceutical form indicated for the condition and locale being treated. Application one to three times daily is usually sufficient.

The term "topical" as employed herein relates to the introduction of the medication, incorporated in a suitable base or vehicle, at the infected site for exertion of local action. Accordingly, such topical compositions include those pharmaceutical forms in which the medication is applied externally by direct contact with the surface to be treated. Conventional pharmaceutical forms for this purpose include ointments, lotions, pastes, jellies, powders, and the like. The term "ointment" embraces formulations (including creams) having oleaginous absorption, water-soluble and emulsion-type bases as described in Remington's Practice of Pharmacy, 11th Edition (1956), page 336, Mack Publishing Company, Topical compositions as herein defined include also those pharmaceutical forms which afford local as opposed to systemic release into the immediate affected areas where such areas are not accessible for direct external application, such forms being, for example, sprays, aerosols and drops.

The following examples are given by way of illustration and are not to be construed as limitations of this invention, many variations of which are possible without departing from the scope and spirit thereof.

Example I

To a solution of 5.0 g. of aminoguanidine nitrate in 175 ml. of methanol, there is added 5.0 g. of dl-17α-chloroethynyl - 13-ethyl-17-hydroxygon-4-en-3-one. After the addition of 2 ml. of 7% nitric acid, the reaction mixture is stirred for three days while reducing the volume of 25 ml. by passing nitrogen over the surface. The resulting precipitate is filtered, washed with acetone to give 1.5 g. of dl-17α-chloroethynyl-13-ethyl-17-hydroxygon-4-en-3-one, amidinohydrazone, nitrate M.P. 200° C. dec.

*Analysis.*—Calcd. for $C_{22}H_{31}ON_4Cl \cdot HNO_3$ (percent): C, 56.70; H, 6.92; N, 15.03; Cl, 7.60. Found (percent): C, 56.59; H, 6.53; N, 15.03; Cl, 8.00.

In a similar manner, dl-17α-chloroethynyl-13-ethyl-17-hydroxygon-4-en-3-one is reacted with 3-amino-1-methylguanidine to afford dl-17α-chloroethynyl-13-ethyl-17-hydroxygon - 4-en - 3-one, N-methylamidinohydrazone, nitrate.

Example II

To a solution of 5.0 g. of aminoguanidine nitrate in 175 ml. of methanol, there is added 5.0 g. of dl-13,17α-diethyl-17-hydroxygon-4-en-3-one. After the addition of 2 ml. of 7% nitric acid, the reaction mixture is stirred while passing nitrogen over the surface to reduce its volume to 25 ml. in the course of three days. The resulting precipitate is filtered to give 4.5 g. of dl-13,17α-diethyl-17-hydroxygon-4-en-3-one, amidinohydrazone, nitrate, M.P. 262° C. dec.

*Analysis.*—Calcd. for $C_{22}H_{36}N_4O \cdot HNO_3$ (percent): C, 60.66; H, 8.56; N, 16.08. Found (percent): C, 60.52; H, 8.18; N, 16.44.

Similarly, dl-13-17α-diethyl-17-hydroxygon-4-en-3-one is reacted with 3-amino-1,1-dimethylguanidine to produce dl-13,17α - diethyl-17-hydroxygon-4-en-3-one, N,N - dimethylamidinohydrazone, nitrate.

Example III

To a solution of 300 mg. of aminoguanidine nitrate in 10.5 ml. of methanol, there is added 300 mg. of d-17α-chloroethynyl-17-hydroxyestr-4-en-3-one. After the reaction mixture is acidified with 7 percent nitric acid, it is stirred for two days while passing nitrogen over the surface to reduce its volume to one half. The resulting precipitate is filtered to give 100 mg. of d-17α-chloroethynyl-17-hydroxyestr-4-en - 3 - one, amidinohydrazone, nitrate; M.P. 248° C. dec.

*Analysis.*—Calc'd for $C_{21}H_{29}ON_4Cl \cdot HNO_3$ (percent): C, 55.80; H, 6.69; Cl, 7.84. Found (percent): C, 55.58; H, 6.40; Cl. 8.07.

In like manner, d-17α-chloroethynyl-17-hydroxyestr-4-en-3-one is reacted with 3-amino-1,1-dipropylguanidine to produce d-17α-chloroethynyl-17-hydroxyestr-4-en-3-one, N,N-dipropylamidinohydrazone, nitrate Example IV A solution of 1.0 g. of aminoguanidine nitrate in 35 ml. methanol is brought to pH 1 with 7 percent nitric acid. After the addition of 1.0 g. of d-17α-ethynyl-17-hydroxyestr-4-en-3-one, the reaction mixture is stirred for five hours while passing nitrogen over its surface to evaporate it to dryness. The residue is dissolved in a small volume of methanol and the product precipitated with acetone to yield 100 mg. of d-17α-ethynyl-17-hydroxyestr-4-en-3-one, amidinohydrazone, nitrate; M.P. 215° C.

*Analysis.*—Calc'd for $C_{21}H_{30}N_4O \cdot HNO_3$ (percent): C, 60.41; H, 7.48. Found (percent): C, 59.98; H, 7.18.

In like manner, d-17α-ethynyl-17-hydroxyestr-4-ene-3-one is reacted with 3-amino-1-ethyl-1-methylguanidine to synthesize d-17α-ethynyl-17-hydroxyestr-4-en-3-one, N-ethyl-N-methyl-aminohydrazone, nitrate.

Example V

To a solution of 1.0 g. aminoguanidine nitrate in 35 ml. of methanol, there is added 1.0 g. of dl-13-ethyl-17α-ethynyl-17-hydroxygon-4-en-3-one. The reaction mixture is adjusted to pH 2 with 7% nitric acid and stirred at 37° C. for three days. The resulting crystalline product is filtered to yield 800 mg. of dl-13-ethyl-17α-ethynyl-17-hydroxygon-4-en-3-one, amidinohydrazone, nitrate; M.P. 261° C. dec.

*Analysis.*—Calc'd for $C_{22}H_{32}N_4O \cdot HNO_3$ (percent): C, 61.23; H, 7.71; N, 16.23. Found (percent) C, 61.37; H. 7.84; N, 16.04.

Repeating the above procedure, with the following aminoguanidines, the hereinafter listed amidinohydrazones of *dl*-13-ethyl-17α-ethynyl-17-hydroxygen-4-en-3-one are prepared:

| Aminoguanidines | Amidinohydrazones |
| --- | --- |
| 3-amino-1, 2-dimethyl-guanidine. | Dl-13-ethyl-17α-ethynyl-17-hydroxy-gon-4-en-3-one, N,N'-dimethyl-amidinohydrazone, nitrate. |
| 3-amino-1-methyl-2-propylguanidine. | Dl-13-ethyl-17α-ethynyl-17-hydroxy-gon-4-en-3-one, N-methyl-N'-propyl-amidinohydrazone, nitrate. |
| 3-amino-1, 2-diethylguanidine | Dl-13-ethyl-17α-ethynyl-17-hydroxy-gon-4-en-3-one, N,N'-diethylami-dinohydrazone, nitrate. |
| 3-amino-2-ethylguanidine | Dl-13-ethyl-17α-ethynyl-17-hydroxy-gon-4-en-3-one, N'-ethylamidino-hydrazone, nitrate. |

Example VI

To a solution of 300 mg. of aminoguanidine in 10 ml. of methanol, there is added 300 mg. of *dl*-17β-hydroxy-13-propyl-17 - (1 - propynyl)gon-4-en-3-one. After the addition of 25 drops of 7 percent nitric acid, the reaction mixture is stirred overnight and the resulting precipitate filtered to give 220 mg. of *dl*-17β-hydroxy-13-propyl-17-(1 - propynyl)gon-4-en-3-one, amidinohydrazone, nitrate, M.P. 212° C.

*Analysis.*—Calc'd for $C_{24}H_{36}N_4O \cdot HNO_3$ (percent): C, 62.72; H, 8.12; N, 15.24. Found (percent): C, 62.61; H, 8.02; N, 15.01.

In like manner, when *dl*-17β-hydroxy-13-propyl-17-(1-propynyl)gon-4-en-3-one is reacted with 3-amino-1-nitroguanidine, there is produced *dl*-17β - hydroxy-13-propyl-17-(1 - propynyl)gon-4-en-3-one, N - nitroamidinohydrazone, nitrate Example VII A solution of 300 mg. of aminoguanidine nitrate in 10 ml. of methanol is added to 300 mg. of *dl*-17α-chloroethynyl-17-hydroxy-13-propylgon-4-en-3-one. After the addition of 10 drops of 7 percent nitric acid, the reaction mixture is stirred. Nitrogen is passed over the mixture for a period of fourteen hours to evaporate the solvent. The residue is treated with acetone to obtain 250 mg. of *dl*-17α-chloroethynyl-17-hydroxy - 13 - propylgon-4-en-3-one, amidinohydrazone, nitrate, M.P. 250° C. dec.

*Analysis.*—Calc'd for $C_{23}H_{33}ON_4Cl$ (percent): C, 57.54; H, 7.14; Cl, 7.80. Found (percent): C, 57.90; H, 7.14; Cl, 7.39.

Similarly, reacting *dl* - 17α - chloroethynyl - 17 - hydroxy-13-propylgon-4-en-3-one with 3 - amino-1-(2-dimethylaminoethyl)guanidine produces *dl* - 17α - chloroethynyl-17-hydroxy-13-propylgon - 4 - en-3-one, N-(2-dimethylaminoethyl)amidinohydrazone, nitrate.

Example VIII

To a solution of 1.0 g. of aminoguanidine nitrate in 30 ml. of methanol is added 1.0 g. of *dl*-13-ethyl-17β-hydroxy-17-vinylgon-4-en-3-one. The volume is reduced to 20 ml. by passing nitrogen over the reaction mixture. After the addition of 3 ml. 7% nitric acid stirring is continued for twenty-four hours. The precipitate is filtered to give 950 mg. of *dl*-13-ethyl-17β-hydroxy-17-vinylgon-4-ene-3-one, amidinohydrazone, nitrate; M.P. 239, 240° C.

*Analysis.*—Calc'd for $C_{22}H_{34}N_4O \cdot HNO_3$ (percent): C, 60.94; H, 8.14; N, 16.6. Found (percent): C, 60.75; H, 7.96; N, 16.18.

Similarly, the above 3-ketosteroid is reacted with 3-amino-1(3-diethylaminopropyl)guanidine to produce *dl*-13-ethyl-17β-hydroxy-17-vinylgon-4-ene-3-one, N-(3 - diethylaminopropyl) amidinohydrazone, nitrate.

Example IX

To a solution of 500 mg. of aminoguanidine nitrate and 30 ml. of methanol there is added 500 mg. of *dl*-17α-ethynyl-17-hydroxy-13-propylgon-4-en-3-one. After the addition of 3 ml. 7% nitric acid, the reaction mixture is stirred for five hours. Standing for two days at room temperature completed the precipitation to give 450 mg. of *dl* - 17α - ethynyl-17-hydroxy-13-propylgon-4-en-3-one, amidinohydrazone, nitrate; M.P. 228° C. dec.

*Analysis.*—Calc'd for $C_{23}H_{34}ON_4 \cdot HNO_3$ (percent): C, 62.00; H, 7.92; N, 15.72. Found (percent): C, 61.81; H, 7.51; N, 15.55.

In the same manner, *dl*-17α-ethynyl-17-hydroxy - 13 - propylgon - 4 - en - 3 - one is reacted with 3-amino-1-(2-dipropylaminoethyl) guanidine to afford *dl* - 17α-ethynyl-17-hydroxy-3-propylgon-4-en - 3 - one, N - (2-dipropylaminoethyl)amidinohydrazone, nitrate.

Example X

To a hot solution of 1.0 g. of 2-(2-imidazolin-2-yl)-hydrazine, hydrochloride in 20 ml. of methanol there is added 1.0 g. of *dl*-13-ethyl-17α-ethynyl-17-hydroxygon-4-en-3-one. After the addition of 20 drops of isopropanolic hydrochloric acid (5.4 N) the reaction mixture is stirred for four hours, put into +5° refrigerator for forty-eight hours and the resulting precipitate filtered to give 800 mg. of *dl*-13-ethyl-17α-ethynyl-17-hydroxygon-4-en-3-one, 2-(2-imidazolin-2-yl) hydrazone, hydrochloride; M.P. 300° C. dec.

*Analysis.*— Calc'd for $C_{24}H_{34}N_4O$ HCl (percent): C, 66.87; H, 8.18; N, 12.99; Cl, 8.23. Found (percent): C, 66.52; H, 8.24; N, 13.4; Cl, 8.69.

Example XI

To a solution of 2.0 g. of aminoguanidine hydrochloride in 60 ml. of methanol, there is added 2.0 g. of 17α-trifluorovinyl-17-hydroestra-4,9-dien-3-one. The volume of the mixture is reduced to 30 ml. under reduced pressure. After the addition of 3 ml. of 10% hydrochloric acid stirring is continued for twenty-four hours. Thereafter, the precipitate is filtered to afford 17α-trifluorovinyl-17 - hydroxyestra-4,9-dien-3-one, amidinohydrazone, hydrochloride.

In the same way, 17α-trifluorovinyl-17-hydroxyestra-4, 9-dien-3-one is reacted with 3-amino-1,1-dimethylguanidine to produce the corresponding N,N-dimethylamidinohydrazone, hydrochloride.

Example XII

To a solution of 1.0 g. of aninoguanidine nitrate in 30 ml. of methanol, there is added 1.0 g. of 17α-ethynyl-17-hydroxyestra-4,9,11-trien-3-one, acetate. The volume of the mixture is reduced to 20 ml. under reduced pressure. After the addition of 3 ml. of 7% nitric acid stirring is continued for twenty-four hours. Thereafter, the precipitate is filtered to afford 17β-acetoxy-17-ethynylestra-4,9, 11-trien-3-one, amidinohydrazone, nitrate.

Similarly, reacting the above estratrienone with 3-amino - 1(2 - butyl-2-methylaminoethyl)guanidine affords 17β - acetoxy - 17 - ethynylestra-4,9,11-trien-3-one, N-(2-butyl-2-ethylaminoethyl)amidinohydrazone, nitrate.

Example XIII

To a solution of 3.0 g. of 3-amino-1-(2-hexamethylene-iminoethyl)guanidine nitrate in 90 ml. of methanol, there is added 3.0 g. of 13-ethyl-17β-hydroxy-3-oxogon-4-ene-17-acrylic acid. The volume of the mixture is reduced to 40 ml. by passing nitrogen over the surface. After the addition of 9 ml. of 7% nitric acid stirring is continued for twenty hours. Thereafter, the precipitate is filtered to afford 13 - ethyl - 17β-hydroxy-3-oxogon-4-ene-17-acrylic acid, N-(2-hexamethyleneiminoethyl)amidinohydrazone, nitrate.

In a similar manner, 3-amino-1-(2-octamethyleneiminoethyl)guanidine is reacted with the above steriod to afford 13-ethyl-17-hydroxy-3-oxogon-4-ene-17α-acrylic acid, N-(2 - octamethyleneiminoethyl)amidinohydrazone, nitrate.

Example XIV

To a solution of 2.0 g. aminoguanidine nitrate in 60 ml. of methanol, there is added 2.0 g. of 13-ethyl-17β-hydroxy-3-oxogon-4-ene-17-propiolic acid. The volume of the mixture is reduced to 30 ml. under reduced pressure.

After the addition of 3 ml. of 7% nitric acid stirring is continued for twenty hours. Thereafter, the precipitate is filtered to afford 13-ethyl-17β-hydroxy-3-oxogon-4-ene-17-propiolic acid, amidinohydrazone, nitrate.

Example XV

Repeating the procedure of the previous examples to react an aminoguanidine with an appropriate 3-ketosteroid,, the following compounds are prepared:

7α-methyl-13,17α-diethyl-17-hydroxygon-4-en-3-one, amidinohydrazone, hydrobromide;
13-ethyl-17β-hydroxy-17-propylgon-4-en-3-one, N-methylamidonohydrazone, hydrochloride;
13 - butyl - 17α-ethyl-17-hydroxygon-4-en-3-one, N,N-dimethylamidinohydrazone, nitrate;
13 - ethyl - 17α-ethynyl-17-hydroxy-5β-gonan-3-one, amidinohydrazone, nitrate;
13 - ethyl-17β-hydroxy-17-(3-hydroxy-1-propynyl)gon-4-en-3-one, N'-methylamidinohydrazone, nitrate;
17α - chloroethynyl-17-hydroxyestra-4,9-dien-3-one, amidinohydrazone, hydrochloride;
13 - ethyl-17β-hydroxy-17-methylgona-4,6-dien-3-one, N-(2-dimethylaminoethyl)amidinohydrazone, nitrate;
13-ethyl-17α-ethynyl-17-hydroxygon-4-en-3-one, amidinohydrazone, acetate, nitrate;
13-ethyl-17α-ethynyl-17-hydroxygon-4-en-3-one, amidinohydrazone, n-heptanoate, nitrate;
13,17α - diethyl-17-hydroxy-6α-methylgon-4-en-3-one, N-(2 - hexamethyleneiminoethyl)amidinohydrazone, nitrate;
17aα - chloroethynyl - 13-ethyl-17a-hydroxy-D-homogon-4-en-3-one, amidinohydrazone, nitrate;
17aα - chloroethynyl-13-ethyl-17a-hydroxy-D-homogona-4,9-dien-3-one, amidinohydrazone, nitrate;
17α - chloroethynyl-17-hydroxy-13-propylgona-4,9-dien-3-one, N-methylamidinohydrazone, hydrobromide;
13 - ethyl - 17β-hydroxy-17-isobut-2'-enylgon-4-en-3-one, amidinohydrazone, nitrate;
17β-hydroxy-13-propyl-17-(1-propynyl)gona-4,9-dien-3-one, amidinohydrazone, hydrochloride;
13-ethyl-17aα-ethynyl-17a-hydroxy-D-homogon-4-en-3-one, amidinohydrazone, nitrate;
17α-ethyl-17-hydroxy-5α-estran-3-one, amidinohydrazone, nitrate;
13-ethyl-17β-hydroxy-17-(1-hydroxyethyl)gon-4-en-3-one, N-ethylamidinohydrazone, hydrochloride;
17α-chloroethynyl-17-hydroxyestra-4,9,11-trien-3-one, amidinohydrazone, nitrate;
17β-hydroxy-7α,17-dimethylestr-4-en-3-one, N'-methylamidinohydrazone, hydrochloride;
13-ethyl-17β-hydroxy-3-oxogona-4,6-diene-17-propionic acid, methyl ester, amidinohydrazone, nitrate;
17α-ethyl-17-hydroxy-2α-methylestr-4-en-3-one, amidinohydrazone, hydrochloride;
17β-hydroxy-17-ethynyl-1α,7α-dimethylestr-4-en-3-one, amidinohydrazone, nitrate;
17β-hydroxy-11β,17-dimethylestr-4-en-3-one, N-ethylamidinohydrazone, nitrate;
17β-hydroxy-17-ethynyl-4-methylestr-4-en-3-one, amidinohydrazone, nitrate; and
13-ethyl-17β-hydroxy-17-ethynylgona-4,8(14)-dien-3-one, amidinohydrazone, hydrochloride.

Example XVI

To a solution of 1.0 g. aminoguanidine, nitrate in 20 ml. of methanol, there is added 1.0 g. of dl-13-ethyl-17β-hydroxy-17-methylgon-4-en-3-one and 2.0 ml. 7% nitric acid. The clear solution is stirred overnight at room temperature and resulting precipitate filtered to give 1.0 g. of dl-13-ethyl-17β-methylgon-4-en-3-one, amidinohydrazone, nitrate, hydrate, M.P. (170°)–195° C.

Analysis.—Calc'd for $C_{21}H_{34}N_4O \cdot HNO_3 \cdot H_2O$ (percent): C, 57.38; H, 8.48; N, 15.93. Found (percent): C, 57.61; H, 8.13; N, 16.11.

Example XVII

To a solution of 2.0 g. aminoguanidine hydrochloride in 60 ml. of methanol, there is added 2.0 g. of dl-17α-chloroethynyl - 13-ethyl-17-methoxygon-4-en-3-one. The volume of the mixture is reduced to 30 ml. by passing nitrogen over the surface. After the addition of 3 ml. of 10% hydrochloric acid stirring is continued for twenty hours. Thereafter, the precipitate is filtered to obtain dl-17α - chloroethynyl-13-ethyl-17-methoxygon-4-en - 3-one, amidinohydrazone, hydrochloride.

In a similar manner, dl-17α-bromoethynyl-13-ethyl-17-ethoxygon-4-en-3-one, amidinohydrazone, nitrate and dl-13 - ethyl - 17α-fluoroethynyl-17-propoxygon-4-en-3-one, N-methylamidinohydrazone, nitrate are prepared.

Example XVIII

To a solution of 20 g. aminoguanidine nitrate in 600 ml. of methanol, there is added 20 g. of 17β-hydroxy-13,17-dipropylgon-4-en-3-one. The volume of the mixture is reduced to 200 ml. under reduced pressure. After the addition of 30 ml. of 7% nitric acid stirring is continued for twenty-four hours. Thereafter, the precipitate is filtered to afford 17β-hydroxy-13,17-dipropylgon-4-en-3-one, amidinohydrazone, nitrate, M.P. 255° C.

It is understood that either the dl-steroids or the specific d- or l-isomers may be employed as starting materials with like results.

It is further understood that the base form of the salts of Examples I through XVII may be prepared by conventional methods and further treated with an acid to form the acid-addition salt thereof.

What is claimed is:

1. A compound selected from the group consisting of those having the formula:

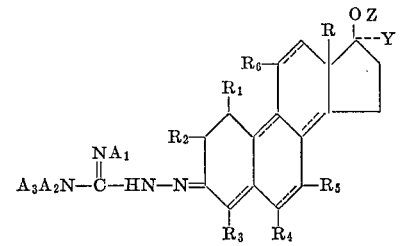

wherein R is lower alkyl; $R_1$, $R_2$, $R_3$, $R_4$, $R_5$ and $R_6$ are selected from the group consisting of hydrogen and methyl with the proviso that no more than one of $R_1$, $R_2$, $R_3$, $R_4$, $R_5$ and $R_6$ are methyl; Z is selected from the group consisting of hydrogen, lower alkyl and lower alkanoyl; Y is selected from the group consisting of lower alkyl, lower alkenyl, hydroxy(lower)alkyl, trifluorovinyl, carboxy(lower)alkenyl, lower alkynyl, halo(lower)alkynyl, hydroxy(lower)alkynyl and carboxy(lower)alkynyl; $A_1$ and $A_2$ when taken separately are selected from the group consisting of hydrogen and lower alkyl; $A_1$ and $A_2$ when taken together form an imidazoline ring; $A_3$ is selected from the group consisting of hydrogen, nitro, lower alkyl, di(lower)alkylamino(lower)alkyl, hexamethyleneimino(lower)alkyl, heptamethyleneimino(lower)alkyl and octamethyleneimino(lower)alkyl with the proviso that when $A_1$ and $A_2$ are taken together to form an imidazoline ring, $A_3$ is hydrogen; wherein one of the 4,5-, 6,7-, 9,10-, 8,14-, and 11, 12-positions are saturated with the remainder of these positions unsaturated; and the pharmaceutically acceptable acid-addition salts thereof.

2. A compound as described in claim 1 which is: dl-17α - chloroethynyl - 13 - ethyl - 17 - hydroxygon - 4 - en-3-one, amidinohydrazone, nitrate.

3. A compound as described in claim 1 which is: dl-13,17α - diethyl - 17 - hydroxygon - 4 - en - 3 - one amidinohydrazone, nitrate.

4. A compound as described in claim 1 which is: *d*-17α-chloroethynyl - 17 - hydroxyestr - 4 - en-3-one, amidinohydrazone, nitrate.

5. A compound as described in claim 1 which is: *d*-17α-ethynyl-17-hydroxyestr-4-en-3-one, amidinohydrazone, nitrate.

6. A compound as described in claim 1 which is: *dl*-13 - ethyl - 17α - ethynyl - 17 - hydroxygon - 4 - en - 3-one, amidinohydrazone, nitrate.

7. A compound as described in claim 1 which is: *dl*-13 - ethyl - 17β - hydroxy - 17 - vinylgon - 4 - en - 3-one, amidinohydrazone, nitrate.

8. A compound as described in claim 1 which is: *dl*-17α chloroethynyl - 17 - hydroxy - 13 - propylgon - 4 - en-3-one, amidinohydrazone, nitrate.

9. A compound as described in claim 1 which is: *dl*-17β - hydroxy - 13 - propyl - 17 - (1 - propynyl)gon - 4-en-3-one, amidinohydrazone, nitrate.

10. A compound as described in claim 1 which is: *dl*-17α ethynyl - 17 - hydroxy - 13 - propylgon - 4 - en - 3-one, amidinohydrazone, nitrate.

11. A compound as described in claim 1 which is: *dl*-13 - ethyl - 17α - ethynyl - 17 - hydroxygon - 4 - en - 3-one, 2-(2-imidazolin-2-yl)hydrazone, hydrochloride.

12. A compound as described in claim 1 which is: *dl*-17β - hydroxy - 13,17 - dipropylgon - 4 - en - 3 - one, amidinohydrazone, nitrate.

13. A compound as described in claim 1 which is: *dl*-13 - ethyl - 17β - hydroxy - 17 - methylgon - 4 - en - 3-one, amidinohydrazone, nitrate hydrate.

References Cited

UNITED STATES PATENTS 3,069,414 12/1962 de Ruggieri _____ 260—239.5
3,251,863 5/1966 Schuetz et al. _____ 260—397

OTHER REFERENCES

Pesez et al.: Bull. Soc. Chim., France (1958) pp. 488–89.

HENRY A. FRENCH, Primary Examiner

U.S. Cl. X.R.

260—397.1, 397.5, 999

UNITED STATES PATENT OFFICE
CERTIFICATE OF CORRECTION

Patent No. 3,507,857　　　　　　　　Dated April 21, 1970

Inventor(s) Kurt W. Ledig and Gerhard R. Wendt

It is certified that error appears in the above-identified patent and that said Letters Patent are hereby corrected as shown below:

In column 2, at line 10, structure II should read:

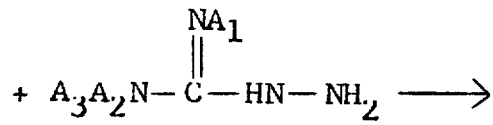

(II)

SIGNED AND
SEALED
AUG 25 1970

(SEAL)
Attest:

Edward M. Fletcher, Jr.
Attesting Officer

WILLIAM E. SCHUYLER, JR.
Commissioner of Patents